83. MILLS.
Grain Scourers.
Centrifugal.

B. T. Trimmer — Grain Scourer, &c.

101946

Patented Apr. 12 1870

Witnesses
Chas. T. Spencer
Geo. H. Miatt

B. T. Trimmer,
By J. Fraser & Co.,
Attys.

UNITED STATES PATENT OFFICE.

B. T. TRIMMER, OF ROCHESTER, NEW YORK.

IMPROVEMENT IN MACHINES FOR SCOURING GRAIN, &c.

Specification forming part of Letters Patent No. 101,946, dated April 12, 1870.

*To all whom it may concern:*

Be it known that I, B. T. TRIMMER, of the city of Rochester, in the county of Monroe and State of New York, have invented a certain new and useful Improvement in Machines for Scouring Grain, Removing the Fiber from Cotton-Seed, &c.; and I do hereby declare that the following is a full and exact description of the same, reference being had to the accompanying drawings, in which—

Figure 1:
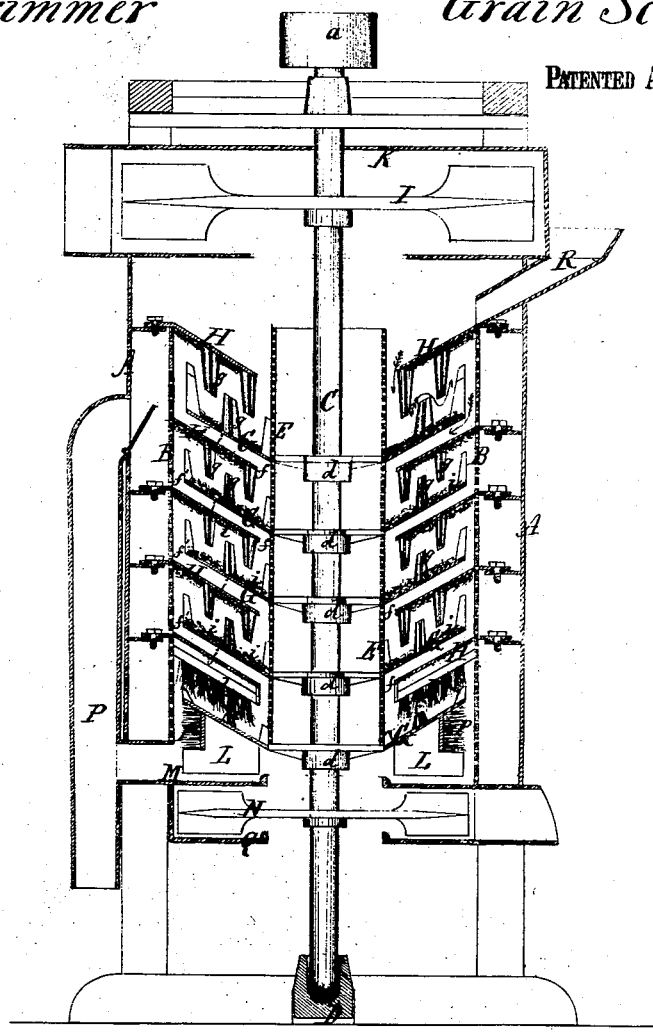
Figure 2:
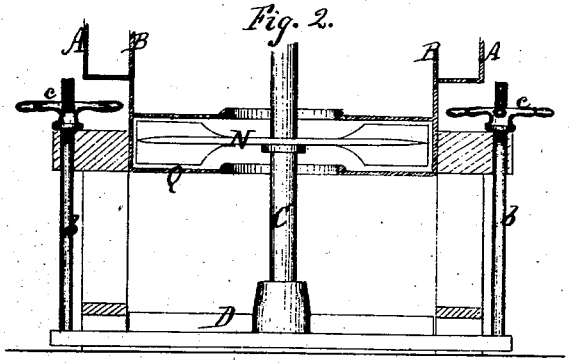
Figure 3:
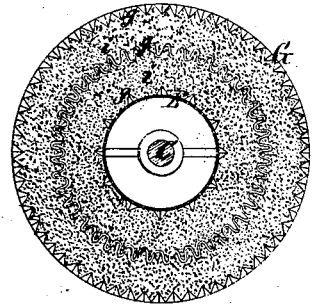

Figure 1 is a vertical section of my improved machine; Fig. 2, a similar section of the lower part, but at right angles to Fig. 1; Fig. 3, a plan of one of the beaters.

This invention consists, essentially, in the arrangement of the scouring-surfaces, as hereinafter described; also, in the arrangement of the inner cylinder and the method of producing the vertical adjustment of the beaters.

In the drawings, A represents the outer case inclosing the parts.

B is the cylinder, which is filled with perforations, as usual, and, if desired, may be made in several sections.

C is the spindle, which extends from bottom to top, being driven by pulley $a$ in the usual manner. At the bottom the spindle rests in a bridge-tree, D, which is adjusted vertically by rods $b\ b$ at the ends, that pass up through bearings of the frame, and have hand-nuts $c\ c$ on top, by which they are elevated. At suitable distances apart on the spindle are mounted fixed hubs $d\ d$, having arms that support an inner perforated cylinder, E, which may either extend entire all the way up, as shown in the drawings, or may be made in sections, with a little space between to facilitate the drawing in and upward escape of the dust.

To the arms or to the inner cylinder are attached the beaters G G, which run around with the spindle, and act, in conjunction with stationary beds H H, to thoroughly scour the grain or other material passing through. The beds are bolted or otherwise suitably attached to the outer casing, as shown. Openings $f\ f$ are made in the center of the beds, of sufficient size not only to allow the passage of the spindle, but also to allow the grain to fall through. Similar spaces, $f'\ f'$, are made around the outer edges of the beaters, and passages $j\ j$ are also formed between the several series of the beaters and beds to allow the passage of grain from one to the other, as will be presently described. The beaters and the stationary beds are both made of conical or concave form, extending downward, as shown, and both are provided with annular projecting teeth-rims $g\ g$, which intermatch and alternate in the revolutions of the beaters. These teeth-rims are preferably corrugated, or of zigzag form, and are thicker at the base than at the apex, the object of which is to facilitate the centrifugal action of the grain in passing through, as will presently be described. The plane spaces between the teeth-rims in either or both the beaters and beds have a coating, $i$, of emery, as clearly shown in Figs. 1 and 3, which is made to adhere by an admixture of india-rubber or other suitable material.

At the bottom of the machine a continuous brush, $k$, is employed in place of the fixed teeth-rims of the bed, the use of which is to finally brush the dust from the grain after it has been thoroughly loosened by the action of the beaters above, and to polish the same.

An exhaust-fan, I, resting in fan-case, K, is situated at the top of the machine. Another fan, L, attached to the under side of the lower beater, works in case M, and still a third one, N, at the base, rests in case O. These fans are all attached to the one spindle. The cases K and N open into the outer air, while M opens into a spout, P, which connects at the top with the space between the outer case and the main cylinder. The fan L has preferably steel brushes $p\ p$ for beating the grain free of dust and polishing it, and, if desired, the brushes $k$ may be made also of steel.

The action is as follows: The grain or other material, being entered through hopper R, falls down in a thin sheet over the inclined surface of the upper bed. Here it strikes at the base of the swiftly-revolving beater, and the centrifugal action throws it upward against its own gravity over the coating of emery, and in a zigzag manner through and over the series of intermatching teeth-rims $g\ g$, and when it finally escapes it is dashed rapidly against the outer cylinder, B. Thence it passes downward over the top of the second inclined bed, and is subjected to the same ordeal as before; and this action is repeated successively till the material reaches the bottom of the machine, when it is finally brushed clear of the dust and polished by the action of the brushes $k\ p$. It is finally passed off by the fan L through the discharge-passage M, while the foul seed drops into case Q and is drawn off by fan N. At the same time that this action is taking place the exhaust-fan I draws all the dust upward through both perforated cylinders B E, as well as through spout P and the open space between the outer case and the main cylinder.

The main feature of novelty in this invention is the construction and arrangement of the beaters and the beds, whereby not only an indirect and upward motion is given to the grain in passing from one beater to another in the series, but also a similar indirect or zigzag action is given to the same in passing over or through the teeth-rims of each individual beater and bed. In passing through the beaters the grain has to go against its own gravity, which is overcome only by the centrifugal action produced by the rapid revolution of the beaters. I claim that by this arrangement I gain more than fourfold the scouring action that is produced in ordinary scouring-machines, since there is more than fourfold the amount of frictional surface to go over, and at every step it is subjected to intense agitation. The tendency of the teeth-rims is to turn it over and over, so that every portion of the surface receives friction, which action is additional to that of beating against the perforated surface of the outer cylinder, which is the only action in ordinary machines. The emery also adds a large amount of friction. I am aware that emery has before been used in scouring-machines, but not in this manner.

Another important advantage of this machine is that the grain cannot fall too abruptly to the bottom of the machine, which is a great fault of ordinary smut-mills. Here it can escape only by a certain and inevitable routine. Another advantage is that, owing to the great amount of friction produced, the length of the machine can be greatly compressed. The inclined form of the beds and beaters is necessary to produce a constant forward moving of the material. A simply horizontal position of the parts would not answer.

In connection with the arrangement of the beaters, the inner perforated cylinder, E, is important, as it serves as a stop to the grain as it passes from one beater to another, thus preventing its escape through the center, while at the same time it allows the dust to pass through, and forms a tunnel for the free upward passage of the latter to the exhaust-fan.

I also claim an advantage in the arrangement for adjusting the spindle higher or lower, as desired. It is common to adjust a spindle by a set screw or key under its lower end; but such would not be so effective in this case, since it is frequently necessary to give a little pitch or angle to the shaft to enable the teeth to intermatch properly on one side or the other. This is done by the adjustment at both ends of the bridge-tree by rods $b$ $b$.

In addition to scouring grain, this machine may be used for other similar purposes. It may be found effective in stripping the fiber from cotton-seed preparatory to planting or making oil.

I claim—

1. The teeth-rims $g$ $g$, made in corrugated or zigzag form, and combined with the beaters G and beds H in such a manner as to produce a rubbing or scouring action auxiliary to that produced by the indirect passage of the grain over and through the teeth, as herein described.

2. In combination with the beaters and beds, (either or both,) provided with the projecting teeth-rims $g$ $g$, the intermediate coating of emery or equivalent material, operating in the manner and for the purpose specified.

3. The combination and arrangement of the steel brushes $p$ $p$ on fan L, vertical brushes $k$ $k$, and beater G, substantially as and for the purpose set forth.

4. The arrangement on the spindle C of the fan I above the beaters and beds, fan L below the same, and fan N below the casing A B, substantially as and for the purposes specified.

5. The combination of the inner perforated cylinder, E, made in sections, with the beaters and beds G H, as described.

6. The arrangement, in the grain-scourer herein described, of the inclined beaters and beds G H, the perforated cylinders B E, the brushes $k$ $p$, and the fans I L N, substantially as herein set forth.

In witness whereof I have hereunto signed my name in the presence of two subscribing witnesses.

B. T. TRIMMER.

Witnesses:
R. F. OSGOOD,
LEE W. MIATT.